(12) United States Patent
Nakatani et al.

(10) Patent No.: US 8,471,440 B2
(45) Date of Patent: Jun. 25, 2013

(54) MAGNETIC HEAD DRIVING PIEZOELECTRIC CERAMIC ACTUATOR

(75) Inventors: Hiroshi Nakatani, Shiga-ken (JP); Masanaga Nishikawa, Ishikawa-ken (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 357 days.

(21) Appl. No.: 12/897,819

(22) Filed: Oct. 5, 2010

(65) Prior Publication Data
US 2011/0084571 A1 Apr. 14, 2011

(30) Foreign Application Priority Data

Oct. 14, 2009 (JP) ................. 2009-236880

(51) Int. Cl.
*H01L 41/047* (2006.01)
*H01L 41/053* (2006.01)

(52) U.S. Cl.
USPC ............ 310/340; 310/328; 310/348; 310/366

(58) Field of Classification Search
USPC ................ 310/32, 328, 340, 348, 365, 366
See application file for complete search history.

(56) References Cited

U.S. PATENT DOCUMENTS

| | | | |
|---|---|---|---|
| 6,105,225 A * | 8/2000 | Torii et al. ................ | 29/25.35 |
| 6,141,844 A * | 11/2000 | Miyagawa et al. .......... | 29/25.35 |
| 6,507,139 B1 * | 1/2003 | Ishino et al. ................ | 310/348 |
| 7,388,319 B2 * | 6/2008 | Bibl et al. .................... | 310/331 |
| 7,786,655 B2 * | 8/2010 | Park et al. .................... | 310/328 |
| 8,053,953 B2 * | 11/2011 | Yamada ........................ | 310/348 |
| 2001/0009344 A1 * | 7/2001 | Furukawa et al. ............ | 310/358 |
| 2003/0127947 A1 * | 7/2003 | Chandran et al. ............ | 310/328 |
| 2006/0207078 A1 * | 9/2006 | Namerikawa et al. ....... | 29/25.35 |

FOREIGN PATENT DOCUMENTS

JP 2002-163870 6/2002

* cited by examiner

*Primary Examiner* — Thomas Dougherty
(74) *Attorney, Agent, or Firm* — Dickstein Shapiro LLP

(57) ABSTRACT

A magnetic head driving piezoelectric ceramic actuator having an actuator body and a coating layer. The actuator body has a piezoelectric ceramic substrate and first and second electrodes. The piezoelectric ceramic substrate has first and second principal surfaces, first and second side surfaces, and first and second edge surfaces. The first electrode has a first external electrode portion formed on a part of the first principal surface, and a second external electrode portion formed on the first edge surface. The second electrode has a third external electrode portion formed on the second edge surface, and a fourth external electrode portion formed on the first principal surface. Each of: at least a part of each of the first and second external electrode portions; and at least a part of each of the third and fourth external electrode portions, constitutes a joined portion mounted on the substrate by an electrically-conductive agent. The coating film covers at least a part of a surface of a portion of the actuator body other than the joined portions.

10 Claims, 5 Drawing Sheets

MAGNETIC HEAD DRIVING PIEZOELECTRIC CERAMIC ACTUATOR

BACKGROUND OF THE INVENTION

1. Field of the Invention

The invention relates to a magnetic head driving piezoelectric ceramic actuator. Specifically, the invention relates to a piezoelectric ceramic actuator for finely adjusting the position of a magnetic head of a magnetic disk device.

2. Description of the Related Art

In the related art, in a magnetic disk device, a voice coil motor is used as an actuator for moving a magnetic head to a desired position on a disk. However, when the magnetic head is positioned by using the voice coil motor, it is difficult to sufficiently increase accuracy of positioning the magnetic head. Thus, there is a proposal of providing a fine-motion actuator between the magnetic head and a coarse-motion actuator such as a voice coil motor, for finely adjusting the position of a magnetic head. In addition, there is a proposal of using a piezoelectric ceramic actuator as a fine-motion actuator. This is because use of the piezoelectric ceramic actuator positions a magnetic head with high accuracy.

Incidentally, a piezoelectric ceramic actuator has a piezoelectric ceramic substrate made from a piezoelectric ceramic. The piezoelectric ceramic substrate is brittle and its mechanical strength is low. In addition, when the piezoelectric ceramic actuator is driven, the piezoelectric ceramic substrate expands and contracts. Thus, when the piezoelectric ceramic actuator is driven, fine dust may be generated from the piezoelectric ceramic substrate. Then, if the fine dust generated from the piezoelectric ceramic substrate attaches a magnetic head or a disk, or contaminates the inside of a magnetic disk device, reliability of reading or writing information is decreased.

In view of such a problem unique to the magnetic head driving piezoelectric ceramic actuator, for example, Japanese Unexamined Patent Application Publication No. 2002-163870 suggests coating a piezoelectric ceramic actuator for finely adjusting the position of a magnetic head, with a resin.

FIG. 5 is a perspective view of a magnetic head supporting mechanism disclosed in Japanese Unexamined Patent Application Publication No. 2002-163870. As shown in FIG. 5, a magnetic head supporting mechanism 100 includes: a suspension 102 having a slider 101 fixed at its end; and a suspension supporting mechanism 103. The suspension supporting mechanism 103 and the suspension 102 are connected to each other by a piezoelectric ceramic actuator 106 via adhesive layers 104 and 105. The surface of the piezoelectric ceramic actuator 106 is coated with a resin coating layer 107. Thus, fine dust is effectively prevented from being generated from the piezoelectric ceramic actuator 106.

However, in the magnetic head supporting mechanism 100, both edge portions of the bottom surface of the actuator 106 are merely connected to the suspension 102 and the suspension supporting mechanism 103 by the adhesive layers 104 and 105. Thus, the mounting strength of the actuator 106 is low.

SUMMARY OF THE INVENTION

The invention is made in view of such a point, and it is an object of the invention to provide a magnetic head driving piezoelectric ceramic actuator which is unlikely to generate dust and can be mounted with a high mounting strength.

A magnetic head driving piezoelectric ceramic actuator according to preferred embodiments of the invention is a magnetic head driving piezoelectric ceramic actuator for driving a magnetic head, which is mounted on a substrate by an electrically-conductive agent. The magnetic head driving piezoelectric ceramic actuator according to the preferred embodiments of the invention comprises an actuator body and a coating layer. The actuator body has a piezoelectric ceramic substrate and first and second electrodes. The piezoelectric ceramic substrate has first and second principal surfaces, first and second side surfaces, and first and second edge surfaces. The first and second principal surfaces extend along a length direction and a width direction. The first and second side surfaces extend along the length direction and a height direction. The first and second edge surfaces extend along the width direction and the height direction. The piezoelectric ceramic substrate is made from a piezoelectric ceramic. The first and second electrodes are for applying a voltage to the piezoelectric ceramic substrate. The coating layer covers a part of a surface of the actuator body. The first electrode has a first external electrode portion and a second external electrode portion. The first external electrode portion is formed on a part of the first principal surface of the piezoelectric ceramic substrate. The second external electrode portion is formed on the first edge surface. The second electrode has a third external electrode portion and a fourth external electrode portion. The third external electrode portion is formed on the second edge surface of the piezoelectric ceramic substrate. The fourth external electrode portion is formed on a part of a portion of the first principal surface which is not covered with the first electrode. Each of: at least a part of each of the first and second external electrode portions of the first electrode; and at least a part of each of the third and fourth external electrode portions of the second electrode, constitutes a joined portion which is joined on the substrate by the electrically-conductive agent. The coating layer covers at least a part of a surface of a portion of the actuator body other than the joined portion.

In a specific aspect of the magnetic head driving piezoelectric ceramic actuator according to the preferred embodiments of the invention, the coating film is an insulating film. According to this configuration, for example, short circuiting between the first and second electrodes, which is caused by dust or the like, can be effectively suppressed.

In another specific aspect of the magnetic head driving piezoelectric ceramic actuator according to the preferred embodiments of the invention, one of an edge of the first external electrode portion on a fourth external electrode portion side and an edge of the fourth external electrode portion on a first external electrode portion side, is covered with the coating film. According to this configuration, for example, short circuiting between the first and second electrodes, which is caused by dust or the like, can be effectively suppressed.

In still another specific aspect of the magnetic head driving piezoelectric ceramic actuator according to the preferred embodiments of the invention, the first and second electrodes apply a voltage to the piezoelectric ceramic substrate in the height direction, so that the actuator body expands and contracts in the length direction. In other words, the actuator body expands and contracts in d31 mode. In this case, due to expansion and contraction of the magnetic head driving piezoelectric ceramic actuator, great stress is likely to be applied to the part joined to the substrate. Thus, the invention in which the magnetic head driving piezoelectric ceramic actuator can be firmly fixed, is particularly effective.

In still another specific aspect of the magnetic head driving piezoelectric ceramic actuator according to the preferred embodiments of the invention, the coating film has a first portion located on the first principal surface, and a second portion located on the second principal surface, and positions of both edges of the first portion in the length direction are different from positions of both edges of the second portion in the length direction. When the magnetic head driving piezoelectric ceramic actuator is driven, stress is likely to concentrate on the edge of the coating film which changes in thickness. Thus, for example, when the positions of the both edges of the first and second portions of the coating film in the length direction correspond to each other, stress is likely to concentrate on parts of the actuator where the both edges of the coating film are provided. On the other hand, in this configuration, the positions of the both edges of the first portion of the coating film in the length direction are different from the positions of the both edges of the second portion in the length direction. Thus, concentration of stress on a specific part of the actuator, is effectively suppressed. Therefore, the mechanical durability of the magnetic head driving piezoelectric ceramic actuator can be improved.

In still another specific aspect of the magnetic head driving piezoelectric ceramic actuator according to the preferred embodiments of the invention, the coating film has a first portion located on the first principal surface, and a second portion located on the second principal surface, and at least one of both edges of each of the first and second principal surfaces in the length direction is non-parallel to the first edge surface. In this configuration, a part where the edge of the coating film, to which relatively great stress is applied when the actuator is driven, is provided, can be dispersed in the length direction. Therefore, the mechanical durability of the magnetic head driving piezoelectric ceramic actuator can be more effectively improved.

In still another specific aspect of the magnetic head driving piezoelectric ceramic actuator according to the preferred embodiments of the invention, the coating film is a resin film.

In still another specific aspect of the magnetic head driving piezoelectric ceramic actuator according to the preferred embodiments of the invention, the electrically-conductive agent is a solder or an electrically-conductive adhesive.

In the invention, since the coating layer is provided, generation of dust from the piezoelectric ceramic substrate when the actuator is driven, is effectively suppressed. In addition, each of the first and second electrodes is formed on the first or second edge surface and the first principal surface, and is joined to the substrate at a portion thereof which is located on the first or second edge surface, and at a portion thereof which is located on the first principal surface. Thus, the actuator is mounted on the substrate with a high mounting strength. In other words, according to the preferred embodiments of the invention, a magnetic head driving piezoelectric ceramic actuator in which dust is unlikely to be generated from a piezoelectric ceramic substrate when the actuator is driven, and which can be mounted on a substrate with a high mounting strength, can be provided.

Other features, elements, characteristics and advantages of the present invention will become more apparent from the following detailed description of preferred embodiments of the present invention with reference to the attached drawings.

DESCRIPTION OF THE PREFERRED EMBODIMENTS

Hereinafter, one preferred embodiment of the invention will be described by using, as an example, a magnetic head driving piezoelectric ceramic actuator 1 shown in FIG. 1.

Figure 1:
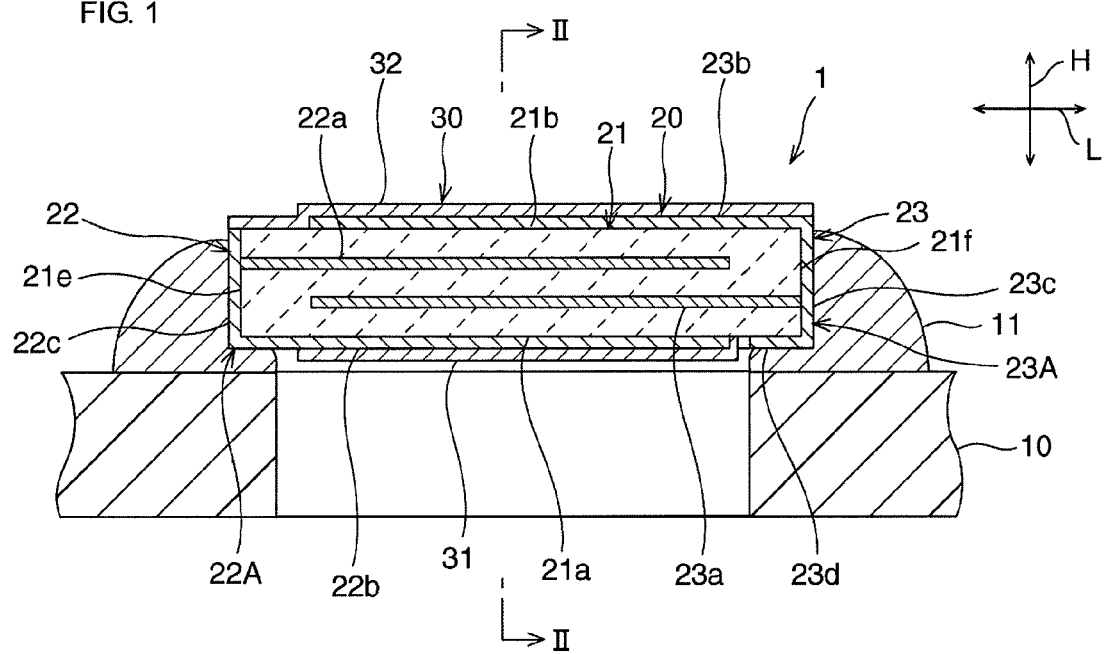
FIG. 1 is a schematic cross-sectional view of a magnetic head driving piezoelectric ceramic actuator according to an embodiment of the invention.

As shown in FIG. 1, the magnetic head driving piezoelectric ceramic actuator 1 (hereinafter, may be referred to merely as "actuator 1") is intended to drive a magnetic head of a magnetic disk device. The actuator 1 is mounted on a substrate 10 which is a part of the magnetic disk device, by an electrically-conductive agent. In the embodiment, specifically, the actuator 1 is mounted on the substrate 10 by a solder 11. However, in the invention, the electrically-conductive agent is not limited to the solder. The electrically-conductive agent is not particularly limited to a specific one, as long as it is capable of connecting the actuator to a wiring on the substrate and joining the actuator to the substrate. For example, an electrically-conductive adhesive in which electrically-conductive fine particles are dispersed in an adhesive, may be used as the electrically-conductive agent.

The actuator 1 includes a substantially rectangular-parallelepiped-shaped actuator body 20. The actuator body 20 includes a piezoelectric ceramic substrate 21 and first and second electrodes 22 and 23. Note that, in the invention, "rectangular parallelepiped" includes, for example, a rectangular parallelepiped whose edges and corners are chamfered or round-chamfered.

Figure 2:
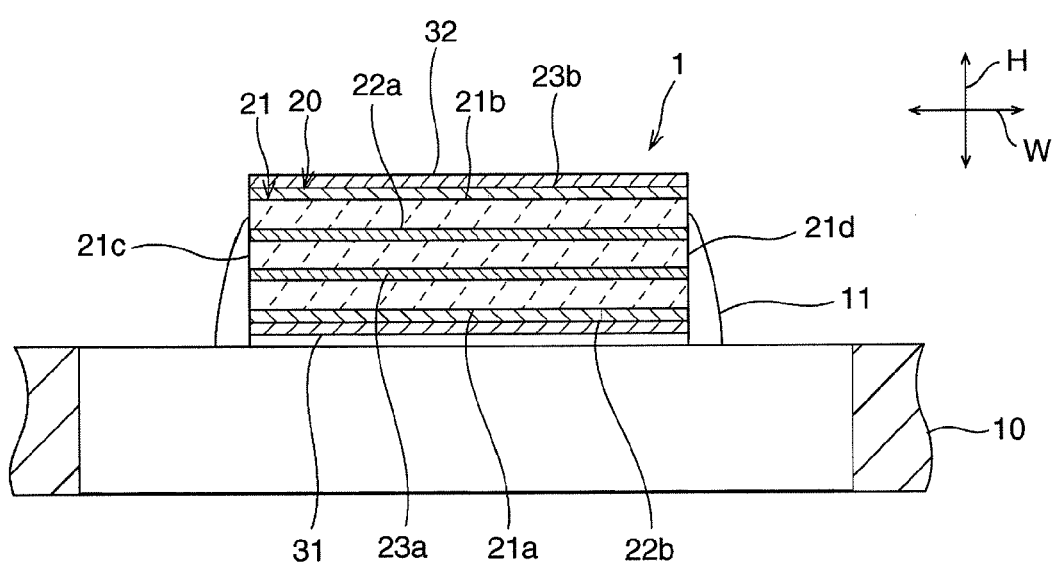
FIG. 2 is a schematic cross-sectional view taken along the line II-II in FIG. 1.

The piezoelectric ceramic substrate 21 has a substantially rectangular parallelepiped shape. As shown in FIGS. 1 and 2, the piezoelectric ceramic substrate 21 has first and second principal surfaces 21a and 21b, first and second side surfaces 21c and 21d, and first and second edge surfaces 21e and 21f. The first and second principal surfaces 21a and 21b extend along a length direction L and a width direction W so as to be parallel to each other. The first and second side surfaces 21c and 21d extend along the length direction L and a height direction H so as to be parallel to each other. The first and second edge surfaces 21e and 21f extend along the width direction W and the height direction H so as to be parallel to each other.

The piezoelectric ceramic substrate 21 is made from a piezoelectric ceramic. Examples of the piezoelectric ceramic include lead zirconate titanate ceramic.

The first and second electrodes 22 and 23 are electrodes for applying a voltage to the piezoelectric ceramic substrate 21. Specifically, in the embodiment, the first and second electrodes 22 and 23 apply a voltage to the piezoelectric ceramic substrate 21 mainly in the height direction H. Then, when the voltage is applied in the height direction H by the first and second electrodes 22 and 23, the piezoelectric ceramic substrate 21 expands and contracts mainly in the length direction L. In other words, the expansion/contraction mode of the actuator 1 of the embodiment is d31.

The first electrode 22 has an internal electrode portion 22a, a first external electrode portion 22b, and a second external electrode portion 22c. The internal electrode portion 22a is formed within the piezoelectric ceramic substrate 21. The internal electrode portion 22a is parallel to the first and second principal surfaces 21a and 21b. The first external electrode portion 22b is formed on at least a part of the first principal surface 21a. The second external electrode portion 22c is formed on the first edge surface 21e. The second external electrode portion 22c is connected to the internal electrode portion 22a and the first external electrode portion 22b.

The second electrode 23 has an internal electrode portion 23a and third to fifth external electrode portions 23c, 23d, and 23b. The internal electrode portion 23a is formed within the piezoelectric ceramic substrate 21. The internal electrode portion 23a is parallel to the first and second principal surfaces 21a and 21b. The internal electrode portions 22a and 23a, the first external electrode portion 22b, the fourth external electrode portion 23d, and the fifth external electrode portion 23b are formed so as to face each other in the height direction H across piezoelectric ceramic layers. The fourth external electrode portion 23d is formed on a part of a portion of the first principal surface 21a which is not covered with the first external electrode portion 22b of the first electrode 22. The fourth external electrode portion 23d and the first external electrode portion 22b are not in contact with each other. The fifth external electrode portion 23b is formed on the second principal surface 21b. The third external electrode portion 23c is formed on the second edge surface 21f. The third external electrode portion 23c is connected to the internal electrode portion 23a, the fourth external electrode portion 23d, and the fifth external electrode portion 23b.

The material of the first and second electrodes 22 and 23 is not particularly limited to a specific one as long as it is an electrically-conductive material. The first and second electrodes 22 and 23 can be formed from a metal, such as Ag, Pd, Au, Pt, Ni, Cu, or Cr, or an alloy, such as Ag/Pd or Ni/Cr.

Note that the structures of the first and second electrodes 22 and 23 are merely illustrative. In the invention, the first and second electrodes are not particularly limited to specific ones as long as they can apply a voltage to the piezoelectric ceramic substrate.

As shown in FIGS. 1 and 2, a part of the surface of the actuator body 20 is covered with a coating film 30. In the embodiment, the coating film 30 is formed of an insulating film having insulating properties. Specifically, the coating film 30 is formed of an insulating resin film which is made from a resin having insulating properties. Among insulating resins, resins having high flexibility, such as polyamide and polyimide resins, can be used as a material for forming the coating film 30. When the coating film 30 is formed by using a resin having high flexibility, blocking of expansion and contraction of the actuator body 20 in d31 mode by the coating film 30 can be effectively reduced.

Further, the resin for forming the coating film 30 is preferably a photosensitive resin. Use of the photosensitive resin allows for patterning by photolithography, thereby enabling the coating film 30 to be formed with high shape accuracy.

Note that the coating film 30 may be formed after the actuator body 20 is formed, but a plurality of actuators 1 may be produced by forming a coating film on a mother substrate in which conductive patterns have been formed within the substrate and on a surface of the substrate, and then cutting the mother substrate into a plurality of pieces. By so doing, many actuators 1 can be produced efficiently.

The coating film 30 has a first portion 31 and a second portion 32. The first portion 31 is located above the first principal surface 21a. The first portion 31 is formed at a central portion in the length direction L. Specifically, the first portion 31 is formed in a region of an area above the first principal surface 21a, other than: a region of the first external electrode portion 22b where the side edge of the second external electrode portion 22c is located; and a region where the fourth external electrode portion 23d is formed. The first portion 31 covers an edge of the first external electrode portion 22b on the fourth external electrode portion 23d side.

On the other hand, the second portion 32 of the coating film 30 is located above the second principal surface 21b. In the embodiment, the second portion 32 covers the entire area above the second principal surface 21b. Thus, as shown in FIG. 1, the positions of both edges of the first portion 31 in the length direction L are different from the positions of both edges of the second portion 32 in the length direction L.

In the embodiment, a part of the first external electrode portion 22b of the first electrode 22 and a part of the second external electrode portion 22c are joined by a solder 11 to an electrode formed on the substrate 10. In other words, at least a part of each of the first and second external electrode portions 22b and 22c of the first electrode 22 constitutes a joined portion 22A which is joined by the solder 11. In addition, a part of the third external electrode portion 23c of the second electrode 23 and a part of the fourth external electrode portion 23d are joined by a solder 11 to an electrode formed on the substrate 10. In other words, at least a part of each of the third and fourth external electrode portions 23c and 23d of the second electrode 23 constitutes a joined portion 23A which is joined by the solder 11.

The coating film 30 covers at least a portion of the actuator body 20 other than the joined portions 22A and 23A. Thus, when the actuator 1 is driven, generation of fine dust from the piezoelectric ceramic substrate 21 is effectively suppressed. Therefore, occurrence of short circuiting between the first and second electrodes 22 and 23, which is caused by generation of dust, can be effectively suppressed. In addition, contamination of the inside of the magnetic disk device by dust can be suppressed.

Further, the piezoelectric ceramic substrate 21 is reinforced by the coating film 30, and thus the strength of the actuator 1 can be increased.

Further, in the embodiment, the part of the first external electrode portion 22b of the first electrode 22 and the part of the second external electrode portion 22c are joined by the solder 11 to the electrode formed on the substrate 10. The part of the third external electrode portion 23c of the second electrode 23 and the part of the fourth external electrode portion 23d are joined by the solder 11 to the electrode formed on the substrate 10. Thus, for example, when compared to the case where only a part of the second external electrode portion 22c and a part of the third external electrode portion 23c are joined by a solder, the mounting strength of the actuator 1 can be increased further. In particular, in the actuator 1 which expands and contracts along the length direction L, in addition to the part of the second external electrode portion 22c and the part of the third external electrode portion 23c, at least the part of the first external electrode portion 22b and at least the part of the fourth external electrode portion 23d are joined by the solders 11, thereby effectively increasing the mounting strength. Therefore, the mounting reliability can be increased.

In other words, by using the actuator 1 of the embodiment, a magnetic head having high reliability and a magnetic disk device which employs the magnetic head can be implemented.

Further, in the embodiment, the coating film 30 is an insulating film, and thus occurrence of short circuiting between the first and second electrodes 22 and 23 can be effectively suppressed. Moreover, in the embodiment, at least one of the edge of the first external electrode portion 22b on the fourth external electrode portion 23d side and the edge of the fourth external electrode portion 23d on the first external electrode portion 22b side is covered with the insulating coating film 30. Therefore, short circuiting between the first external electrode portion 22b and the fourth external electrode portion 23d can be effectively suppressed.

Further, the wettability of the solder 11 with respect to the coating film 30 made from the resin is lower than the wettability of the solder 11 with respect to the first and second electrodes 22 and 23. Thus, flowing of the solder 11 joined to the fourth external electrode portion 23d, to the first external electrode portion 22b side is effectively suppressed. Therefore, short circuiting between the first external electrode portion 22b and the fourth external electrode portion 23d can be further effectively suppressed. As a result, it is not necessary to use a dedicated mounter which can perform a fine operation, for mounting the actuator 1, and the actuator 1 can be easily mounted with high workability at a low cost. By using the actuator 1, a low-cost magnetic head and a magnetic disk device which employs the magnetic head can be implemented.

Incidentally, when the actuator 1 is driven, stress is likely to concentrate on the edge of the coating film 30 which changes in thickness. Thus, for example, when the position of an edge of the first portion of the coating film corresponds to the position of an edge of the second portion, stress is likely to concentrate on the corresponding part.

On the other hand, in the embodiment, the positions of the both edges of the first portion 31 in the length direction L are different from the positions of the both edges of the second portion 32 in the length direction L. Thus, stress is unlikely to concentrate on a specific part of the actuator 1, and is dispersed. Therefore, the mechanical durability of the actuator 1 can be improved.

MODIFIED EXAMPLE

The following will describe a modified example of the above embodiment. In the following description, members having substantially the same functions as those in the above embodiment are designated by the same reference numerals, and the description thereof is omitted.

In the above embodiment, both edges of the first portion 31 of the coating film 30 in the length direction L and both edges of the second portion 32 in the length direction L are parallel to the first and second edge surfaces 21e and 21f. However, the invention is not limited to this configuration. For example, at least one of: at least one of both edges of the first portion 31 of the coating film 30 in the length direction L; and at least one of both edges of the second portion 32 in the length direction L, may be non-parallel to the first and second edge surfaces 21e and 21f.

Figure 3:
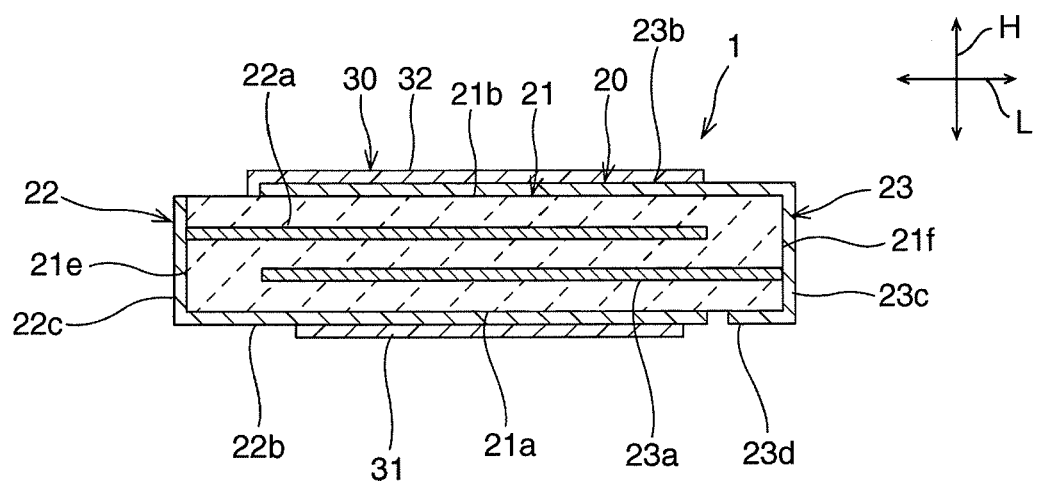
FIG. 3 is a schematic cross-sectional view of a magnetic head driving piezoelectric ceramic actuator according to a modified example.
Figure 4:
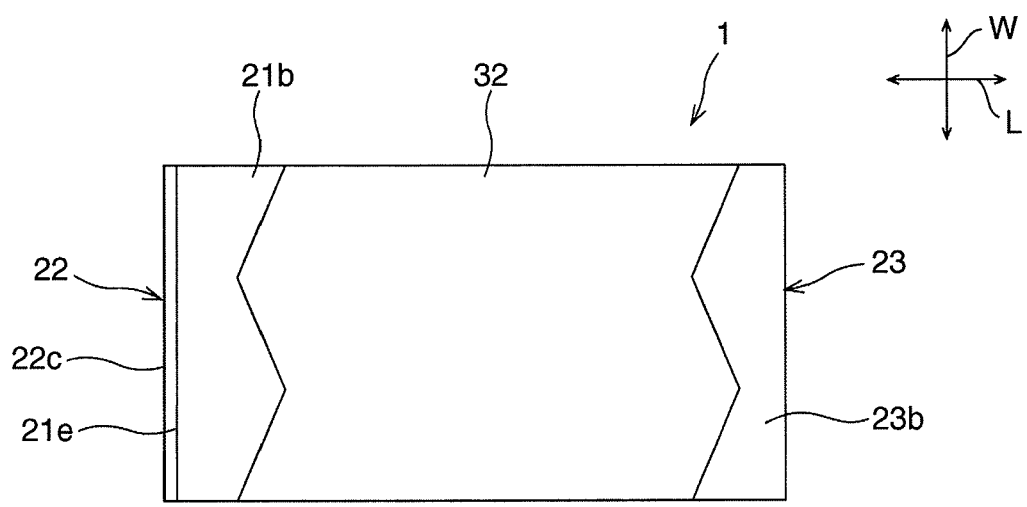
FIG. 4 is a schematic plan view of the magnetic head driving piezoelectric ceramic actuator according to the modified example.
Figure 5:
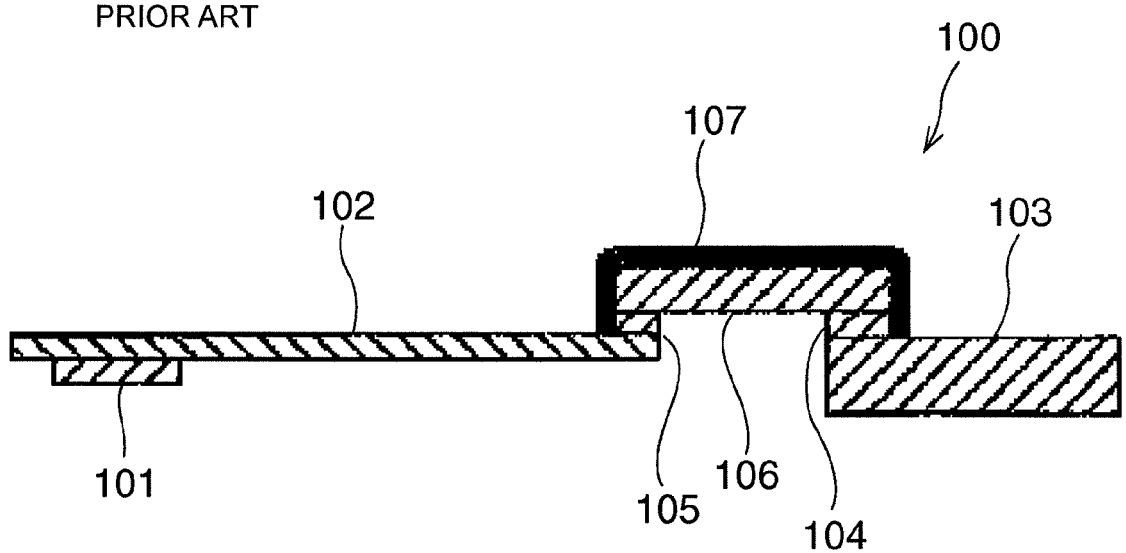
FIG. 5 is a perspective view of a magnetic head supporting mechanism disclosed in Japanese Unexamined Patent Application Publication No. 2002-163870.

For example, in the modified example, as shown in FIGS. 3 and 4, both edges of the second portion 32 of the coating film 30 in the length direction L are non-parallel to the first and second edge surfaces 21e and 21f. Similarly, both edges of the first portion 31 of the coating film 30 in the length direction L are also non-parallel to the first and second edge surfaces 21e and 21f. By so forming, the positions of both edges of the first and second portions 31 and 32 of the coating film 30, on which stress is likely to concentrate, can be dispersed in the length direction L. Thus, concentration of stress on a specific part of the actuator 1 can be effectively suppressed. Therefore, the mechanical durability of the actuator 1 can be further effectively improved.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A magnetic head driving piezoelectric ceramic actuator for driving a magnetic head, the actuator comprising:
    an actuator body having a piezoelectric ceramic substrate which has first and second principal surfaces extending along a length direction and a width direction, first and second side surfaces extending along the length direction and a height direction, and first and second edge surfaces extending along the width direction and the height direction;
    first and second electrodes configured to apply a voltage to the piezoelectric ceramic substrate, wherein
    the first electrode has a first external electrode portion located on a part of the first principal surface of the piezoelectric ceramic substrate, and a second external electrode portion located on the first edge surface of the piezoelectric ceramic substrate,
    the second electrode has a third external electrode portion located on the second edge surface of the piezoelectric ceramic substrate, and a fourth external electrode portion located on a part of the first principal surface which is not covered with the first electrode, and
    each of: at least a part of each of the first and second external electrode portions of the first electrode; and at least a part of each of the third and fourth external electrode portions of the second electrode, constitute respective joined portions which are joined on a substrate by an electrically-conductive agent; and
    a coating layer that covers at least a part of a surface of the actuator body other than the joined portions.

2. The magnetic head driving piezoelectric ceramic actuator according to claim 1, wherein the coating layer is an insulating film.

3. The magnetic head driving piezoelectric ceramic actuator according to claim 2, wherein one of an edge of the first external electrode portion on a fourth external electrode portion side and an edge of the fourth external electrode portion on a first external electrode portion side, is covered with the coating layer.

4. The magnetic head driving piezoelectric ceramic actuator according to claim 1, wherein the first and second electrodes apply a voltage to the piezoelectric ceramic substrate in a height direction thereof, so that the actuator body expands and contracts in a length direction thereof.

5. The magnetic head driving piezoelectric ceramic actuator according to claim 1, wherein
    the coating layer has a first portion located on the first principal surface, and a second portion located on the second principal surface, and
    positions of both edges of the first portion in a length direction are different from positions of both edges of the second portion in the length direction.

6. The magnetic head driving piezoelectric ceramic actuator according to claim 1, wherein
    the coating layer has a first portion located on the first principal surface, and a second portion located on the second principal surface, and
    at least one of both edges of each of the first and second principal surfaces in a length direction is non-parallel to the first edge surface.

7. The magnetic head driving piezoelectric ceramic actuator according to claim 1, wherein the coating layer is a resin film.

8. The magnetic head driving piezoelectric ceramic actuator according to claim 7, wherein the resin film is a photosensitive resin.

9. The magnetic head driving piezoelectric ceramic actuator according to claim 1, wherein the electrically-conductive agent is one of a solder and an electrically-conductive adhesive.

10. The magnetic head driving piezoelectric ceramic actuator according to claim 1, wherein the actuator has a d31 expansion/contraction mode.

* * * * *